(12) United States Patent
Shao

(10) Patent No.: US 12,366,848 B2
(45) Date of Patent: Jul. 22, 2025

(54) METHOD AND SYSTEM FOR INTELLIGENT RECOMMENDATION OF PRODUCTION PROCESS BY INDUSTRIAL INTERNET OF THINGS INFORMATION CLOUD SHARING

(71) Applicant: CHENGDU QINCHUAN IOT TECHNOLOGY CO., LTD., Sichuan (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/914,045

(22) Filed: Oct. 11, 2024

(65) Prior Publication Data
US 2025/0036108 A1    Jan. 30, 2025

(30) Foreign Application Priority Data
Sep. 2, 2024    (CN) .......................... 202411215452.1

(51) Int. Cl.
G05B 19/418     (2006.01)
G16Y 40/35      (2020.01)

(52) U.S. Cl.
CPC ... G05B 19/41845 (2013.01); G05B 19/4184 (2013.01); G05B 19/41875 (2013.01); *G16Y 40/35* (2020.01)

(58) Field of Classification Search
CPC .......... G05B 19/41845; G05B 19/4184; G05B 19/41875; G16Y 40/35
See application file for complete search history.

(56) References Cited

U.S. PATENT DOCUMENTS

2016/0274552 A1*  9/2016  Strohmenger ......... G06Q 10/06
2017/0177754 A1*  6/2017  Jin ........................... G06F 17/18
(Continued)

FOREIGN PATENT DOCUMENTS

CN    101673100 A    3/2010
CN    108733016 A    11/2018
(Continued)

OTHER PUBLICATIONS

Chai, Tianyou, Industrial AI and Industrial Internet Collaboratively Achieving Production Process Intelligence and Its Future Perspectives, Control Engineering of China, 30(8): 1378-1388, 2023.

*Primary Examiner* — Christopher E. Everett
(74) *Attorney, Agent, or Firm* — Porus IP LLC

(57) ABSTRACT

Disclosed is method and system for intelligent recommendation of a production process by Industrial Internet of Things (IIoT) information cloud sharing. The method includes: obtaining and storing production data of the production line; determining, based on the production data, whether an operating parameter of the production line equipment needs to be adjusted; in response to a determination that the operating parameter of the production line equipment needs to be adjusted, generating, based on the production data, a production process parameter and an adjust time; and generating, based on the production process parameter and the adjust time, a process adjustment instruction and issuing the process adjustment instruction to the IIoT management platform; analyzing the process adjustment instructions, and regulating the operating parameter of the production line equipment based on the process adjustment instruction when the adjust time is reached.

12 Claims, 4 Drawing Sheets

(56) References Cited

U.S. PATENT DOCUMENTS

| | | | | |
|---|---|---|---|---|
| 2018/0113442 A1* | 4/2018 | Nixon | ................ | G05B 19/4184 |
| 2020/0326684 A1* | 10/2020 | Chand | .................. | G05B 23/024 |
| 2021/0096551 A1* | 4/2021 | Sayyarrodsari | .. | G06Q 10/06395 |
| 2022/0221844 A1* | 7/2022 | Amaro, Jr. | ............ | H04L 41/344 |
| 2024/0019847 A1* | 1/2024 | SayyarRodsari | .. | G05B 19/4155 |

FOREIGN PATENT DOCUMENTS

| | | | |
|---|---|---|---|
| CN | 108764597 | A | 11/2018 |
| CN | 109358588 | A | 2/2019 |
| CN | 111797989 | B | 12/2020 |
| CN | 113221723 | A | 8/2021 |
| CN | 109472358 | B | 10/2021 |
| CN | 114442569 | A | 5/2022 |
| CN | 115146875 | B | 12/2022 |
| CN | 115481876 | A | 12/2022 |
| CN | 115984026 | A | 4/2023 |
| CN | 111625918 | B | 5/2023 |
| CN | 116149273 | A | 5/2023 |
| CN | 116880416 | A | 10/2023 |
| CN | 116974248 | A | 10/2023 |
| CN | 117538189 | A | 2/2024 |
| IN | 2023011056395 | A | 9/2023 |

* cited by examiner

METHOD AND SYSTEM FOR INTELLIGENT RECOMMENDATION OF PRODUCTION PROCESS BY INDUSTRIAL INTERNET OF THINGS INFORMATION CLOUD SHARING

CROSS-REFERENCE TO RELATED APPLICATIONS

This application claims priority of Chinese Patent Application No. 202411215452.1, filed on Sep. 2, 2024, the contents of which are hereby incorporated by reference.

TECHNICAL FIELD

The present disclosure relates to the field of Industrial Internet of Things (IIoT) and intelligent manufacturing, and in particular, to a method and system for intelligent recommendation of production processes by IIoT information cloud sharing.

BACKGROUND

Industrial Internet of Things (IIoT) technology is widely used in manufacturing, smart cities, energy management, and many other fields. With the wide application of the IIoT technology, the amount of data generated by each production link in the production line has increased dramatically. However, how to effectively utilize the data in the production process to optimize the production process and improve the production efficiency and product quality has become an important challenge for the manufacturing industry today. Currently, the selection of production processes mostly relies on manual experience or fixed processes, and the lack of intelligent and personalized recommendation mechanisms makes it difficult to meet the complex and changing demands of production.

Therefore, it is necessary to provide a method and system for intelligent recommendation of the production process by IIoT information cloud sharing, which is capable of providing intelligent and personalized production process recommendations to improve production efficiency and product quality.

SUMMARY

One or more embodiments of the present disclosure provide a method for intelligent recommendation of a production process by Industrial Internet of Things (IIoT) information cloud sharing, wherein the method is implemented in a cloud platform, and the cloud platform includes a distributed server, wherein the cloud platform connects to multiple IIoT systems corresponding to multiple factories through the distributed server; wherein the IIoT system includes an IIoT user platform, an IIoT service platform, an IIoT management platform, an IIoT sensor network platform, and an IIoT perception control platform; wherein, the IIoT perception control platform is configured as a production line equipment and a data acquisition device deployed on a production line, the IIoT perception control platform is configured to realize data interaction with the IIoT management platform through the IIoT sensor network platform, and the IIoT management platform is configured to realize data interaction with the cloud platform; and the method includes: obtaining and storing, based on the IIoT management platform, production data of the production line; determining, based on the production data, whether an operating parameter of the production line equipment needs to be adjusted; in response to a determination that the operating parameter of the production line equipment needs to be adjusted, generating, based on the production data, a production process parameter and an adjust time; and generating, based on the production process parameter and the adjust time, a process adjustment instruction and issuing the process adjustment instruction to the IIoT management platform; analyzing the process adjustment instructions via the IIoT management platform, and regulating, via the IIoT management platform, the operating parameter of the production line equipment through a control system of the IIoT perception control platform based on the process adjustment instruction when the adjust time is reached; wherein the production process parameter includes at least one of a target screening parameter, a target conveying parameter, a target assembly parameter, and a target quality detection parameter, and the production line equipment includes at least one of a screening equipment, a conveying device, an assembly equipment and a quality detection equipment; wherein the regulating the operating parameter of the production line equipment through a control system of the IIoT perception control platform based on the process adjustment instruction includes: regulating, based on the process adjustment instruction, a first working parameter of the screening equipment to make the operating parameter of the screening equipment reach the target screening parameter; regulating, based on the process adjustment instruction, a second working parameter of the conveying device to make the operating parameter of the conveying device reach the target conveying parameter; regulating, based on the process adjustment instruction, a first setting parameter of the assembly equipment to make the operating parameter of the assembly device reach the target assembly parameter; or regulating, based on the process adjustment instruction, a second setting parameter of the quality detection equipment to make the operating parameter of the quality detection equipment reach the target quality detection parameter.

One of the embodiments of the present disclosure provides a system for intelligent recommendation of the production process by the Industrial Internet of Things (IIoT) information cloud sharing, wherein the system including the cloud platform, and the cloud platform includes the distributed server; a data receiving module, a data processing module, an intelligent recommendation module, and a user interaction module; wherein the cloud platform connects to multiple IIoT systems corresponding to multiple factories through the distributed server; wherein the IIoT system includes the IIoT user platform, the IIoT service platform, the IIoT management platform, the IIoT sensor network platform, and the IIoT perception control platform; wherein the IIoT perception control platform is configured as the production line equipment and the data acquisition device deployed on the production line, the IIoT perception control platform is configured to realize data interaction with the IIoT management platform through the IIoT sensor network platform, and the IIoT management platform is configured to realize data interaction with the cloud platform; the data receiving module is configured to realize data interaction with the IIoT management platform of the IIoT system through the distributed server to receive production data of the corresponding IIoT system, the data processing module is configured to process the production data obtained through the data receiving module, the intelligent recommendation module is configured to make intelligent recommendation of the production process based on the processed production data, and the user interaction module is configured to display a recommendation result for a user to view and interact with the user; the cloud platform is configured to: obtain and store, based on the IIoT management platform, the production data of the production line; determine, based on the production data, whether the operating parameter of the production line equipment need to be adjusted; in response to a determination that the operating parameter of the production line equipment needs to be adjusted, generate, based on the production data, the production process parameter and the adjust time; and generate, based on the production process parameter and the adjust time, the process adjustment instruction and issuing the process adjustment instruction to the IIoT management platform; analyze the process adjustment instruction via the IIoT management platform, and regulate, by the IIoT management platform, the operating parameter of the production line equipment through a control system of the IIoT perception control platform based on the process adjustment instruction when the adjustment time is reached; wherein the production process parameter includes at least one of the target screening parameter, the target conveying parameter, the target assembly parameter, and the target quality detection parameter, and the production line equipment includes at least one of a screening equipment, a conveying device, an assembly equipment and a quality detection equipment; wherein to regulate the operating parameter of the production line equipment through a control system of the IIoT perception control platform based on the process adjustment instruction, the cloud platform is further configured to: regulate, based on the process adjustment instruction, a first working parameter of the screening equipment to make the operating parameter of the screening equipment reach the target screening parameter; regulate, based on the process adjustment instruction, a second working parameter of the conveying device to make the operating parameter of the conveying device reach the target conveying parameter; regulate, based on the process adjustment instruction, a first setting parameter of the assembly equipment to make the operating parameter of the assembly device reach the target assembly parameter; or regulate, based on the process adjustment instruction, a second setting parameter of the quality detection equipment to make the operating parameter of the quality detection equipment reach the target quality detection parameter.

One or more embodiments of the present disclosure provide a computer readable storage medium, wherein the storage media storage computer instructions, when the computer reads the computer instructions in the storage medium, the computer executes a method for intelligent recommendation of a production process by IIoT information cloud sharing as described in any embodiment of the present disclosure.

In the embodiments of the present disclosure, through the communication connection between the Industrial Internet of Things system and the cloud platform, a personalized production process recommendation scheme may be generated based on the production data of the production line equipment, which can help the production enterprise to quickly select the optimal production process scheme, to improve production efficiency and product quality.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
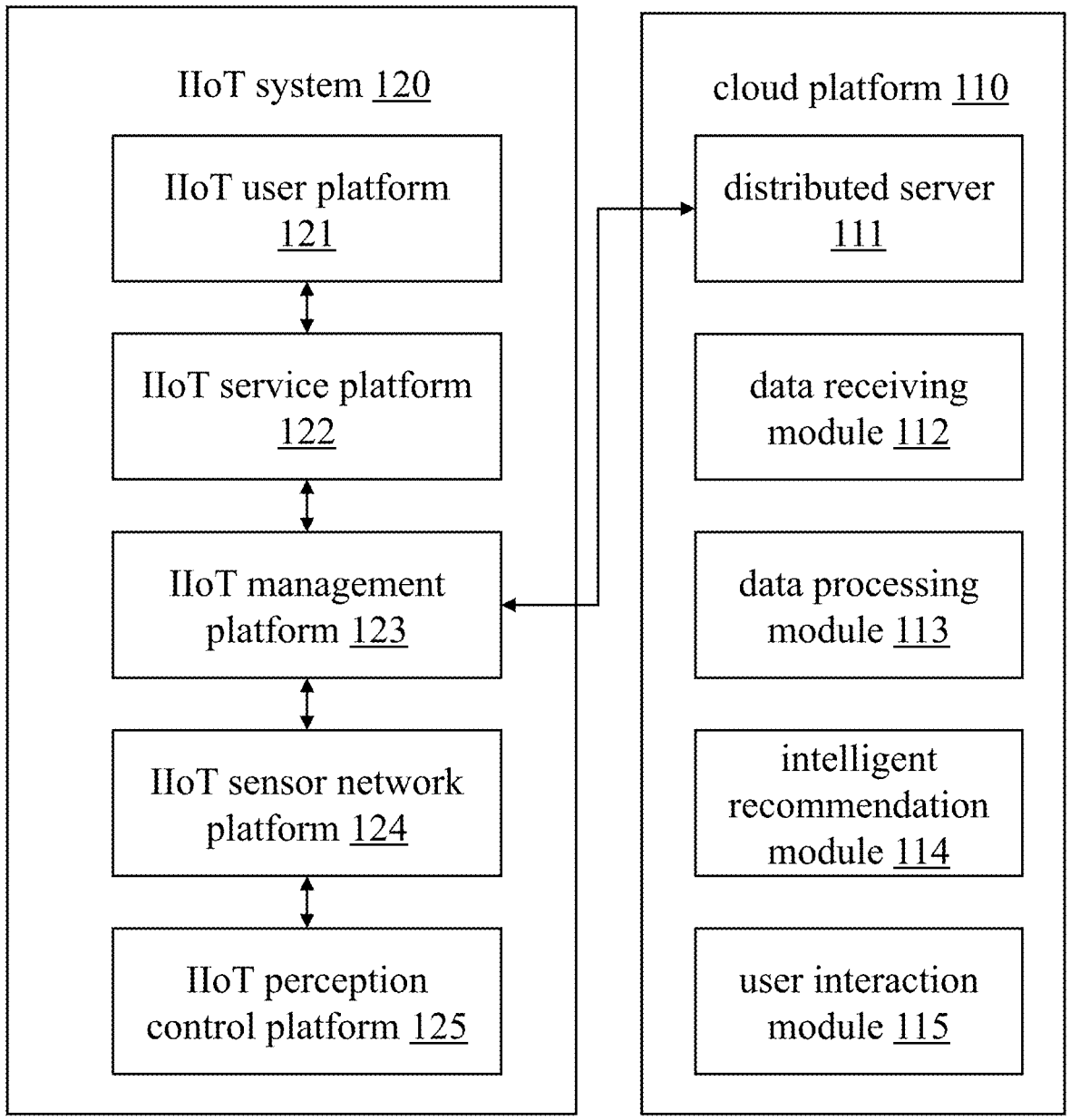
FIG. 1 is a schematic diagram of the structure of a system for intelligent recommendation of a production process by Industrial Internet of Things information according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system", "device" as used herein, "unit" and/or "module" as used herein is a way to distinguish between different components, elements, parts, sections or assemblies at different levels. However, the words may be replaced by other expressions if other words accomplish the same purpose.

FIG. 1 is a schematic diagram of the structure of a system for intelligent recommendation of a production process by Industrial Internet of Things (IIoT) information according to some embodiments of the present disclosure. It should be noted that the following embodiments are used only for explaining the present disclosure and do not constitute a limitation of the present disclosure.

As shown in FIG. 1, in some embodiments, the system 100 for the intelligent recommendation of the production process by the IIoT information cloud sharing may include a cloud platform 110 and an IIoT system 120.

In some embodiments, information and/or data may be exchanged between one or more platforms or devices in the system 100 for the intelligent recommendation of the production process by the IIoT information cloud sharing via a network. In some embodiments, the network may be any one or more of a wired network or a wireless network.

The cloud platform 110 is a service provision platform based on cloud computing technology, which may provide various computing resources and services via the Internet. In some embodiments, the cloud platform 110 may include a distributed server 111, a data receiving module 112, a data processing module 113, an intelligent recommendation module 114, and a user interaction module 115. Only by way of example, the cloud platform 110 may include a private cloud, a public cloud, a hybrid cloud, a community cloud, a distributed cloud, an on-premises cloud, a multi-tier cloud, etc., or any combination thereof.

In some embodiments, the cloud platform 110 may be communicatively connected to a plurality of IIoT systems 120 corresponding to a plurality of factories via the distributed server 111.

The data receiving module 112 may collect production data from the IIoT system 120. In some embodiments, the data receiving module 112 may perform data interfacing with an IIoT management platform 123 of the IIoT system 120 via the distributed server 111 to receive the corresponding IIoT system's production data. The plurality of IIoT systems 120 may desensitize their respective production data and upload the production data to the cloud platform 110. For example, the production data may include, but is not limited to, a product type, a product characteristic parameter, product quality inspection data, as well as the number, layout, status, production parameters, etc., of various types of production line equipment corresponding to the corresponding production process and the respective processes.

The data processing module 113 may process data and/or information obtained from other devices/parts or components. The data processing module 113 may include a processor. The processor may process data and/or information obtained from other devices or system components. The processor may execute program instructions based on such data, information, and/or processing results to perform one or more of the functions described in the embodiments of the present disclosure. By way of example only, the processor may include a central processing unit (CPU), an application-specific integrated circuit (ASIC), or the like, or any combination of the above. In some embodiments, the processor may include a plurality of modules, and the different modules may be used to execute separate program instructions.

In some embodiments, the data processing module 113 may process the collected raw data (e.g., the production data obtained via the data receiving module 112). For example, data cleansing, removing noise and outliers, or the like. In some embodiments, the data processing module 113 may perform data integration to unify the production data from different sources under the same framework, and then standardize the processing to obtain the processed production data. The data integration ensures consistency of data formats and protocols and provides a high-quality data source for subsequent analysis. In some embodiments, the data processing module 113 may also include a data storage center, and the data processing module 113 may categorize and store the production data that has been processed to the data storage center.

The intelligent recommendation module 114 may perform the intelligent recommendation of production processes based on processed production data. In some embodiments, the intelligent recommendation module 114 may include a processor to process data and/or information obtained from other devices or system components (e.g., the data processing module 113 or a data storage center).

In some embodiments, the intelligent recommendation module 114 may construct a production characteristic model based on historical data and an industry knowledge base, and then train and optimize the model using a machine learning algorithm. In some embodiments, the intelligent recommendation module 114 may generate a personalized production process recommendation scheme based on real-time production data and user needs. The machine learning algorithm may include deep learning and reinforcement learning algorithms, or the like. In some embodiments, the recommendation scheme may include at least one of optimization of the production process, adjustment of the process parameters, and recommendation of the equipment configuration.

The user interaction module 115 may display information (e.g., recommendation results) for the user to view and interact with the user. The user interacting with the user interaction module 115 includes a cloud platform user. For example, the user interaction module 115 may provide an intuitive and easy-to-use user interface for the cloud platform user to view the intelligent recommendation results. In some embodiments, the cloud platform user may make production adjustments based on the recommendation scheme displayed by the user interaction module 115 and provide real-time feedback on the adjustment results. In some embodiments, the cloud platform user may also rate and comment on the recommendation scheme via the user interaction module 115, providing data support for subsequent recommendation optimization.

The IIoT refers to the application of intelligent computing, data analytics, and network connectivity to industrial environments. The IIoT system 120 enables real-time data collection, transmission, and analysis through the interconnection of sensors, devices, machines, systems, and humans to achieve intelligent industrial operations management. Each factory may correspond to an IIoT system.

In some embodiments, the IIoT system 120 may include an IIoT user platform 121, an IIoT service platform 122, the IIoT management platform 123, an IIoT sensor network platform 124, and an IIoT perception control platform 125.

The IIoT user platform 121 is a platform that provides information or services to users of the IIoT system 120. The user of the IIoT system may be a staff member of a factory corresponding to the IIoT system, i.e., a factory user. In some embodiments, the factory user may be a person in charge or leadership of the factory. In some embodiments, the IIoT user platform 121 may be configured as a terminal device.

The IIoT service platform 122 is a platform that connects the IIoT user platform 121 with the IIoT management platform 123 and realizes information transmission between the IIoT user platform 121 and the IIoT management platform 123.

In some embodiments, the production data of the IIoT system 120 may be transmitted to the distributed server 111 of the cloud platform 110 via the IIoT service platform 122. In some embodiments, process adjustment instruction generated by the cloud platform 110 may be transmitted via the IIoT service platform 122 to the IIoT management platform 123 for analyzing.

The IIoT management platform 123 is responsible for resource management, monitoring, and maintenance of the entire IIoT system to ensure stable operation of the system, and to provide a platform for perception management and control management functions for the IIoT operation system. For example, the IIoT management platform 123 may manage the IIoT system 120. In some embodiments, the IIoT management platform 123 is a platform for communicating and connecting with the distributed server 111 of the cloud platform 110 and is a platform between the cloud platform 110 and the IIoT system 120 for realizing the data interaction.

In some embodiments, the IIoT management platform 123 may be communicatively connected to a control system of the IIoT perception control platform 125 via the IIoT sensor network platform 124 to intelligently regulate the operating parameters of the production line equipment corresponding to the IIoT perception control platform 125. In some embodiments, the IIoT management platform 123 may analyze the received process adjustment instruction, and based on the process adjustment instruction when the adjust time is reached, via the control system of the IIoT perception control platform 125 to regulate the operating parameters of the production line equipment. More about regulating the operating parameters may be found in FIG. 2 to FIG. 4 and their related descriptions.

The IIoT sensor network platform 124 is a platform for integrated management of sensing communication. In some embodiments, the IIoT sensor network platform 124 may realize the functions of sensing communication for sensing information and sensing communication for controlling information. In some embodiments, the IIoT sensor network platform 124 may interact with the IIoT perception control platform 125 and the IIoT management platform 123 for data.

The IIoT perception control platform 125 is configured as the production line equipment as well as a data acquisition device deployed on the production line for real-time sensing and dynamic control of the production data. In some embodiments, the IIoT perception control platform 125 realizes data interaction with the IIoT management platform 123 via the IIoT sensor network platform 124.

In some embodiments, the IIoT perception control platform 125 may acquire and store the production data of the production line via the data acquisition device.

In some embodiments, the IIoT system 120 may also include a storage device to store the production data in the production line as well as other data related to the production line, such as a historical fault record, product parameter data, historical maintenance records, or the like.

The production line is a series of continuous operational processes or equipment set up to improve productivity in manufacturing and assembly processes. For example, an automobile manufacturing line, an electronics production line, a food processing line, or the like.

The production line equipment refers to mechanical equipment and tools that are used in the production line to perform specific production tasks and is the equipment on the production line that is associated with the product production. The production tasks may include processing of materials, assembly, testing, packaging, or the like. In some embodiments, the production line equipment may be automated equipment. In some embodiments, the IIoT perception control platform 125 may include corresponding the production line equipment.

According to some embodiments of the present disclosure, a production process of an ultra-temperature sensor is used as an example for illustrating the method and system for the intelligent recommendation of the production process by the IIoT information cloud sharing. In some embodiments, the production process of the ultra-temperature sensor may sequentially include thermostat screening, thermistor soldering, pin crimping, assembling, gluing, and testing. In some embodiments, for the production line of the ultra-temperature sensor, the production line equipment may include at least one of a screening equipment, an assembly equipment, a quality detection equipment, and a conveying device.

The screening equipment is equipment that performs a full range of tests on a material or device (e.g., a thermostat) to ensure that the quality and performance of the material or device meets standards. In some embodiments, the screening equipment may include a thermostat screening equipment.

The assembly equipment is equipment that may assemble parts and components according to design requirements. For example, parts such as thermostats, thermistors, connectors, pins, or the like may be assembled in accordance with the design requirements to obtain an ultra-temperature sensor core. In some embodiments, the assembly equipment may include ultra-temperature sensor insert assembly equipment.

In some embodiments, the assembling method may include welding, crimping, or the like, and accordingly, the ultra-temperature sensor inner core assembling equipment may include a non-standard specialized machine, or the like.

The quality detection equipment may perform a quality inspection of the ultra-temperature sensor core. In some embodiments, the quality detection equipment may include one or more of a digital multimeter, a voltage withstand tester, a high-temperature test chamber, an aging test chamber, an environmental simulation test equipment, an infrared thermal camera, an oscilloscope, or the like.

The conveying device may convey materials, such as thermostats, thermistors, or the like. In some embodiments, the conveying device may include a conveyor belt.

In some embodiments, the production line equipment may also include equipment for glue injection, finished product inspection, finished product packaging, or the like to perform the production process of the ultra-temperature sensor. More about the production line equipment may be found in FIG. 2 and its related descriptions.

In some embodiments, the production line equipment may include the data acquisition device and a control system.

The data acquisition device is a device for collecting the production data. The data acquisition device may be deployed on a production line.

In some embodiments, the data acquisition device may include an image acquisition device and a location tracking device. The image acquisition device is a camera deployed at a plurality of locations on the production line to capture image data in the production line. Location tracking devices are Radio Frequency Identification (RFID) readers that are used to track the flow of raw materials and semi-finished products in a production line and record product information.

In some embodiments, the data acquisition device may include sensors deployed at various locations on the production line. The sensors may collect multi-dimensional data about the production line environment and the production line equipment. For example, the sensors may include vibration sensors, temperature sensors, pressure sensors, and humidity sensors deployed on the production line. More about the vibration sensors, temperature sensors, and humidity sensors may be found in FIG. 2 to FIG. 4 and their related descriptions.

The control system may be used to regulate the operating parameters of the production line. In some embodiments, the control system may be communicatively coupled with the IIoT management platform 123 to regulate the operating parameter of the production line equipment in accordance with instruction issued by the IIoT management platform 123. More about how to regulate the operating parameter may be found in FIG. 2 and its related descriptions.

In some embodiments, the control system may include a Programmable Logic Controller (PLC). The PLC is an electronic system for digital arithmetic operations used to automate and control machinery or processes, which controls mechanical equipment by using programmable memory to store and execute instructions for logical operations, sequential control, timing, counting, and arithmetic operations, or the like. In some embodiments, the control system may include a controller, such as a PLC, corresponding to each of the thermostat screening equipment, the assembly equipment, the quality detection equipment, and the conveying device.

According to some embodiments of the present disclosure, through the communication connection between the industrial Internet of Things system and the cloud platform, a personalized production process recommendation scheme may be generated based on the production data of the production line equipment, which can help the production enterprise to quickly select the optimal production process scheme, to improve production efficiency and product quality.

Figure 2:
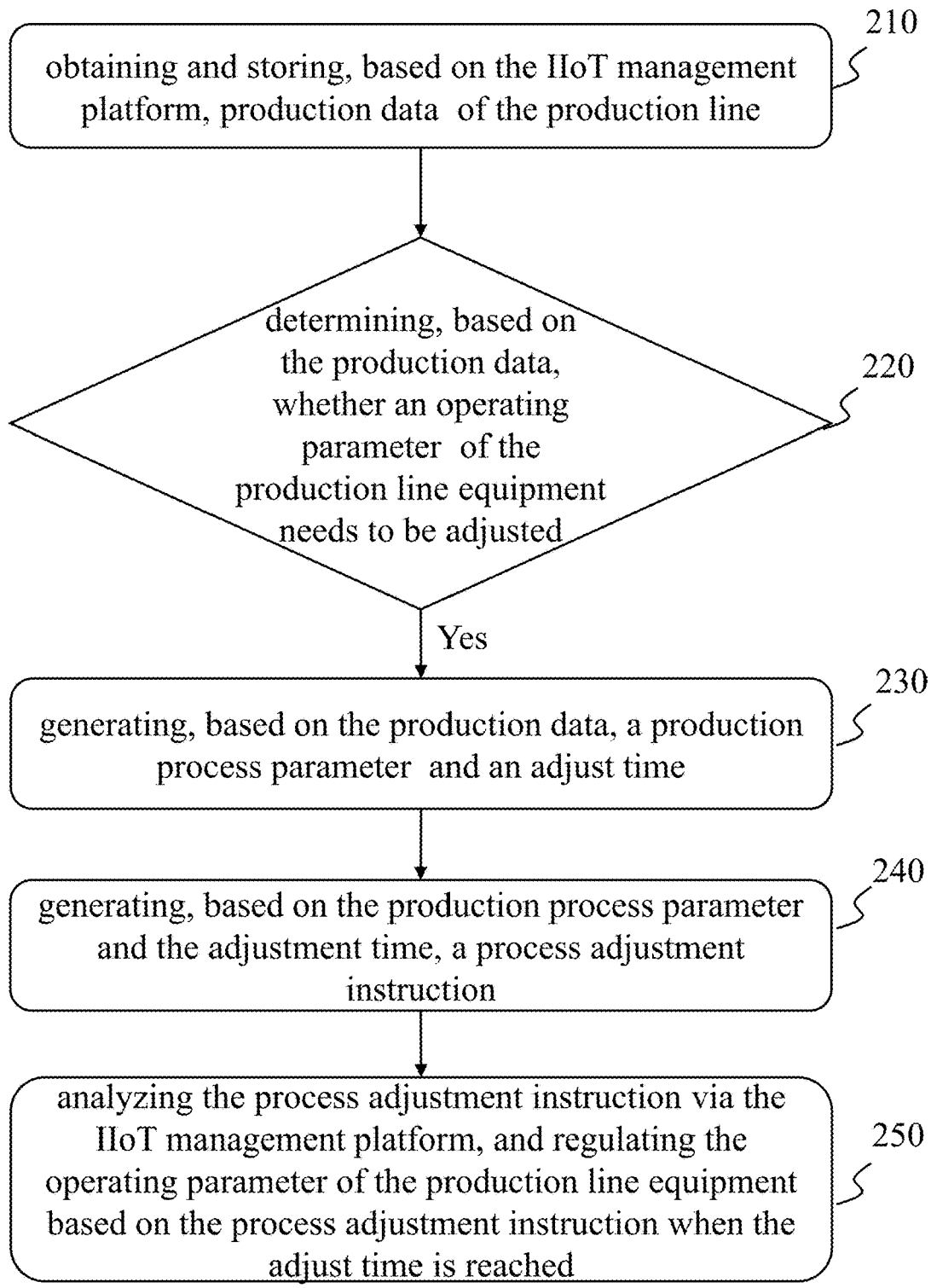
FIG. 2 is an exemplary flowchart of a method for the intelligent recommendation of the production process by the Industrial Internet of Things information according to some embodiments of the present disclosure.

FIG. 2 is an exemplary flowchart of a method for the intelligent recommendation of the production process by the IIoT information according to some embodiments of the present disclosure. In some embodiments, the process 200 may be performed on the cloud platform 110. As shown in FIG. 2, the process 200 may include the following steps. For the IIoT system corresponding to any one of the plurality of factories, the cloud platform 110 may perform the following steps.

Step 210, obtaining and storing the production data of the production line based on the IIoT management platform.

The production data are data related to the production of the production line. In some embodiments, the production data may include at least one of product image data, product record parameters, production process data, equipment status data, raw material and semi-finished product data, or product quality detection data.

The product image data are data of a product image captured on the production line. In some embodiments, the product image data may be acquired by an image acquisition device.

The product record parameters are parameters that are directly related to the production process. In some embodiments, the product record parameters may include at least one of material consumption, energy usage, production beat, production batch, or product production rate. The production beat is the interval between successive production of two products. In some embodiments, the product record parameters may be obtained by recording of the production process by the production line equipment (e.g., the data acquisition device).

The production process data refers to the process parameters of a production stage. The production process of a product may include multiple production stages, and a production stage may correspond to a production task. In some embodiments, the production process data may include at least one of temperature, pressure, speed, humidity, or time for assembly and packaging. In some embodiments, the production process data may be obtained by a temperature sensor, a pressure sensor, a humidity sensor, or the like in the data acquisition device.

The equipment status data are status data associated with the production line equipment. In some embodiments, the equipment status data may include at least one of an equipment type, an equipment specification, an equipment operating time, or an efficiency. The device specification may include maximum operating power, maximum operating voltage, maximum operating current, maximum load, or the like. In some embodiments, the equipment status data may be determined in advance based on basic attributes of the production line equipment, or may be obtained by monitoring the production line equipment (e.g., by a voltage detector or a current detector) during the production.

The raw material and semi-finished product data are data related to raw materials and semi-finished products. In some embodiments, the raw material and semi-finished product data may include an inventory of the raw material, a conveyance speed, and a current location, as well as a conveyance speed, and a current location of the semi-finished product. In some embodiments, the raw material and semi-finished product data may be obtained by a location tracking device. In some embodiments, for a production line of an overtemperature sensor, the raw materials and semi-finished products may include at least one of a thermostat, a thermistor, a pin, a connector, a soldering material, a potting adhesive, or a material that is required for packaging.

The product quality detection data are data obtained by detecting the quality of a product. In some embodiments, the product quality detection data may include at least one of a product specification, a pass rate, a defect type, or a defect rate. For example, the defect type may include thermostat consistency issues, soldering issues, measurement accuracy issues, or the like. In some embodiments, for the production line of overtemperature sensors, the product specifications may include basic performance parameters, electrical characteristics, environmental suitability, physical characteristics, or the like. In some embodiments, the product quality detection data may be obtained by a quality detection device.

In some embodiments, the production line equipment of the IIoT perception control platform may acquire the production data on the production line and transmit it to the IIoT management platform via the IIoT sensor network platform.

In some embodiments, the cloud platform (e.g., the data receiving module) may be communicatively connected to the IIoT management platform of the IIoT system via the distributed server to acquire the production data of the production line. In some embodiments, the production data are transmitted by the IIoT management platform to the distributed server of the cloud platform, and then is acquired by the data receiving module.

Step 220, determining whether the operating parameter of the production line equipment needs to be adjusted based on the production data.

The operating parameter is the parameter related to the production process performed by the production line equipment.

In some embodiments, the operating parameter may include at least one of the screening parameter, the conveying parameter, the assembly parameter, and the quality detection parameter.

The screening parameter is parameter used by the screening equipment to perform the screening process. In some embodiments, the screening parameter may include one or more of the thermostat screening parameter, such as one or more of the thermostat size, the thermostat type, the cosmetic blemish, and the thermostat screening speed. The thermostat screening speed is the number of thermostats screened per unit of time. The unit time may be set according to the actual demand.

The conveying parameter is the parameter of the material conveyed by the conveying device. The materials may include thermostats, thermistors, connectors, pins, and materials required for encapsulation. In some embodiments, the conveying parameter may include one or more of the conveying beat, the material conveying speed, or the like. The conveying beat is the interval between successive conveyances of two material products. The material conveying speed is the length of the material passing through the conveying device per unit time.

The assembly parameter is a parameter used by the assembly device to perform the assembly process. In some embodiments, the assembly parameter may include one or more of the soldering parameters, the connection method, the packaging parameters, or the like. In some embodiments, the soldering parameters may include power, speed, time, focal point position, or the like for soldering. In some embodiments, the connections may include a connection between the thermostat and the thermistor, or a connection between two thermistors (if a plurality of thermistors is included). In some embodiments, the encapsulation parameters may include the speed, pressure, time, or the like, of encapsulating the inner core of the hyperthermia sensor.

The quality detection parameter is a parameter of the quality detection device performing detection. In some embodiments, the quality detection parameter may include one or more of the accuracy parameters, the measurement range parameters, the environmental simulation parameters, the response time parameters, or the like. In some embodiments, the accuracy parameters refer to a range of deviation between the measured value of the overtemperature sensor and the actual temperature value, expressed as a percentage or a specific temperature value. In some embodiments, the measurement range parameters are a temperature interval in which the hyperthermia sensor is capable of accurately measuring. In some embodiments, the environmental simulation parameters may include parameters of simulating the test conditions of a real-use environment, such as temperature, humidity, or the like. In some embodiments, the response time is the time required for the overtemperature sensor from sensing a temperature change to outputting a stable signal.

In some embodiments, in response a determination that the product qualification rate of the product in the product quality detection data of the production data is lower than a reference qualification threshold and/or the production rate is lower than a reference rate threshold, the cloud platform may determine that the operating parameter of the production line equipment needs to be adjusted. The reference threshold is a threshold value predicted by the cloud platform based on the production data of various IIoT systems with the same type for judging whether it is necessary to adjust the operating parameter of the production line equipment. Reference qualification threshold and reference rate threshold may also be set or adjusted artificially. If the qualification rate of the product is lower than the reference qualification threshold and/or the production rate is lower than the reference rate threshold, it indicates that at this time, there may be a decrease in production efficiency or quality, and therefore the operating parameter needs to be adjusted to improve the production efficiency or the quality of the produced product.

In some embodiments, if the number of consecutive times that a qualification rate of the product is judged to be lower than a reference qualification threshold and/or a production rate is lower than a reference rate threshold reaches a reference number of times, the cloud platform may judge that the operating parameter of the production line equipment needs to be adjusted. The reference number of times may be set or adjusted artificially.

In some embodiments, the cloud platform may determine that the operating parameter of the production line equipment needs to be adjusted based on an instruction to change the production requirements that is actively inputted to the IIoT system by the factory user.

In some embodiments, the cloud platform may determine whether the operating parameter of the production line equipment needs to be adjusted by determining whether the production line equipment is subject to a possible malfunction or hidden danger.

In some embodiments, a vibration sensor deployed on the production line may be configured to obtain vibration data. The vibration data is the vibration condition of the production line equipment detected by the vibration sensor. In some embodiments, the vibration data may include one or more of the vibration frequency, the amplitude, the vibration velocity, the vibration acceleration, or the like.

In some embodiments, the cloud platform may determine a fault probability sequence through a fault prediction model based on the production data of the production line, a historical fault record, vibration data, product parameter data, a historical maintenance record, and reference data; and based on a judgment result of whether the fault probability sequence satisfies a fault condition, determine whether the operating parameter of the production line equipment needs to be adjusted.

The historical fault record is data related to faults of the production line equipment at historical time. In some embodiments, the historical fault record may include at least one of the time of occurrence of the fault, the type of the fault, and the time of resolution of the fault. The product parameter data is data related to the characteristics and performance of a currently manufactured product. In some embodiments, the product parameter data may include at least one of the number of thermistors for each product, the method of connecting the components to each other, the product structural data, the product use, or the like. The product structure data may include dimensions, shapes, material distribution, or the like. Connections between components may include connections between thermostats and thermistors, connections between thermistors and thermistors, or the like, e.g., in series or parallel.

The historical maintenance record is data related to maintenance performed by the production line equipment at historical times. In some embodiments, the historical maintenance record may include at least one of the maintenance date and time, the maintenance type, and a record of the maintenance operation. The maintenance type may include preventive maintenance and fault repair. The maintenance operation record may include a record of one or more steps in the maintenance process.

The reference data is data related to the production line obtained by the cloud platform based on analyzing data from a plurality of the IIoT systems with the same type. In some embodiments, the reference data may include reference production data and reference fault data. Reference production data is data obtained by the cloud platform through analyzing the production data of a plurality of IIoTs with the same type. The reference fault data is the data obtained by the cloud platform through analyzing the fault data of a plurality of the IIoTs with the same type.

In some embodiments, the historical fault record, the product parameter data, and the historical maintenance record may be stored in a storage device of the IIoT system, and the cloud platform may obtain them from the storage device through a communication connection between the distributed server and the IIoT system.

The fault probability sequence is a sequence consisting of possible faults of different production line equipment in the future and corresponding probabilities. For example, the fault probability sequence may include faults and corresponding probabilities that the different production line equipments may have in future periods. The starting and ending points of the future time periods may be set according to actual needs.

In some embodiments, the fault prediction model is a machine learning model. In some embodiments, the fault prediction model may be a Long Short Term Memory (LSTM) neural network model. The fault prediction model may also be a machine learning model with another structure, such as a neural network model, a recurrent neural network model, or the like.

In some embodiments, inputs to the fault prediction model may include the production data of the production line, the historical fault record, the vibration data, product parameter data, the historical maintenance record, and the reference data, and outputs may include a fault probability sequence at future time points.

In some embodiments, the cloud platform may obtain a plurality of first training samples with first labels to constitute a first training sample set, and obtain the fault prediction model by training the first training sample set. The first training samples may be obtained in historical data. In some embodiments, the first training samples may include sample production data, sample fault record, sample vibration data, sample product parameter data, sample maintenance record, and sample reference data. The first labels may be a fault that occurs after a time period corresponding to the first training sample. The first labels may be determined by systematic or human labeling. For example, if fault B and fault C actually occur at a future time point corresponding to the historical data, the labels for fault B and fault C may be 1, and the labels for other fault types may be 0.

In some embodiments, the cloud platform may input the first training sample set into the initial fault prediction model to perform multiple rounds of iterations. Each round of iteration comprises: selecting one or more first training samples from the first training sample set, inputting the one or more first training samples into the initial fault prediction model, obtaining one or more model prediction outputs corresponding to the one or more first training samples; calculating a value of the loss function by a formula of a predefined loss function based on the model prediction output corresponding to the one or more first training samples and the first labels of the one or more first training samples; and inversely updating a model parameter of the initial fault prediction model based on the value of the loss function. When the iteration end condition is satisfied, the iteration is ended, and the trained fault prediction model is obtained. The iteration end condition may be that the loss function converges, the number of iterations reaches a threshold, or the like.

The fault condition is a predetermined condition for determining whether to adjust the operating parameter. In some embodiments, the fault condition may include a probability of fault greater than a probability threshold. The probability threshold may be set or adjusted by a human.

In some embodiments, if the probability corresponding to one of the faults in the fault probability sequence is greater than the probability threshold, the cloud platform may determine that an adjustment of the operating parameter of the production line equipment is required. For example, when the probability of a particular fault of the fault probability sequence is greater than the probability threshold, the cloud platform may determine that the operating parameter of the production line equipment corresponding to the fault needs to be adjusted. In some embodiments, for different production line equipment, the cloud platform may also set different probability thresholds.

For faults with a probability of fault below the probability threshold, the manifestation of these faults may not be particularly noticeable or unchecked, but they may occur later and still affect production rates and qualification rates. In some embodiments, the cloud platform may further determine whether the operating parameter of the production line equipment needs to be adjusted by predicting efficiency distribution data.

In some embodiments, in response to a determination that the fault probability sequence does not satisfy the fault condition, the cloud platform may predict, based on the fault probability sequence, the distribution data of the production efficiency of the production line after a predetermined period of time; and based on the predicted efficiency distribution data corresponding to multiple consecutive predictions at preset intervals, determine whether to adjust the operating parameter of the production line equipment. The preset interval is the time interval between two consecutive predictions. For example, the preset interval may include 1 min, 2 min, 3 min, 4 min, or the like.

The predicted efficiency distribution data is the trend of change in the productivity of the production line and the corresponding probability. For example, the predicted efficiency distribution data may be represented as (type of change trend, probability of change). The type of change trend may include up, unchanged, and down, and the corresponding probabilities of change are the up probability, the unchanged probability, and the down probability.

The sum of the upward probability, the unchanged probability, and the downward probability is 100%. For example, the predicted efficiency distribution data may be represented as (up, 70%), (unchanged, 20%), and (down, 10%). The productivity may be measured by the number of qualified products produced by the production line over a period of time.

In some embodiments, the fault prediction model may include a prediction layer and a review layer, and the cloud platform may predict predicted efficiency distribution data of the production line after a predetermined period of time through the review layer of the fault prediction model.

Figure 3:
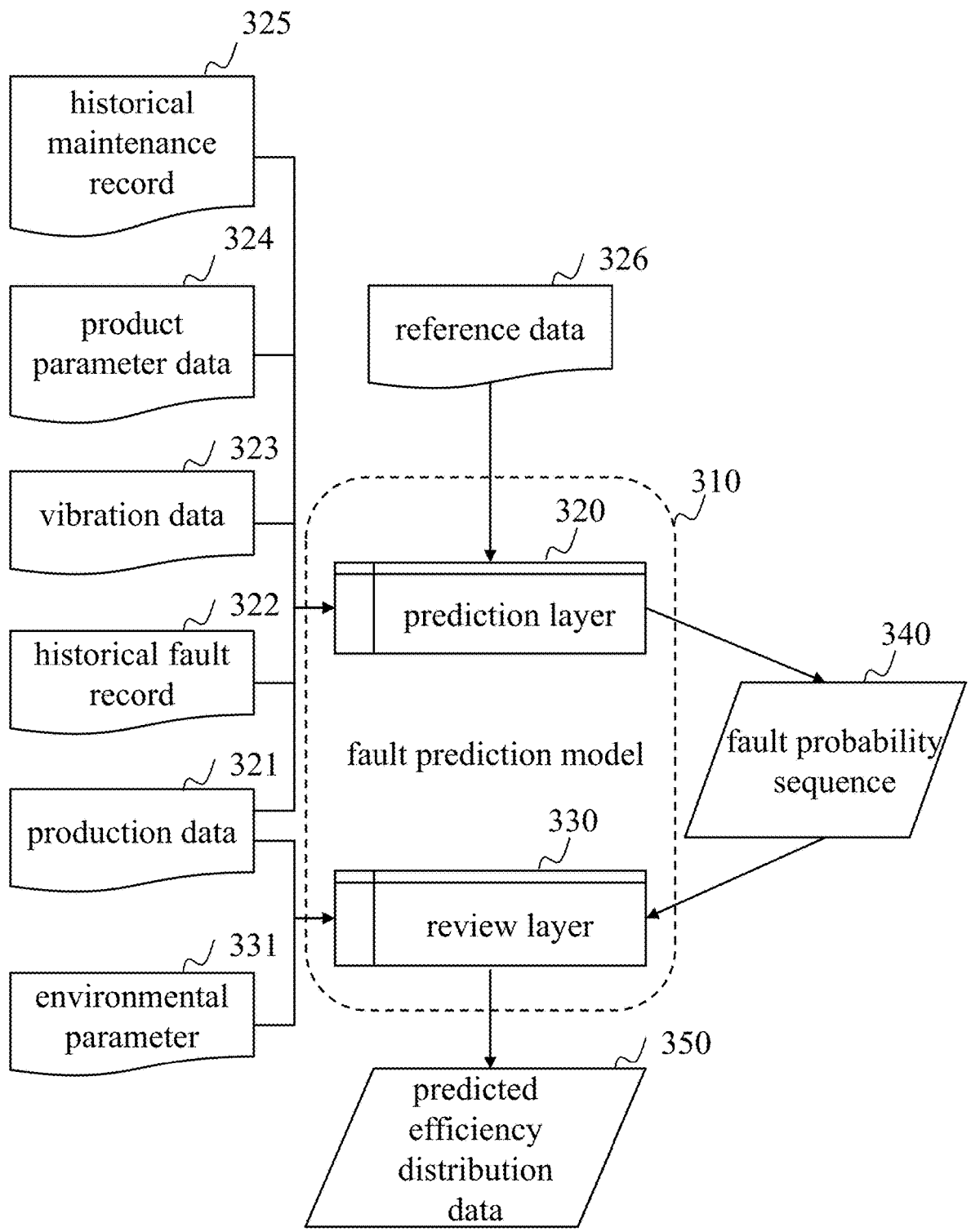
FIG. 3 is an exemplary schematic diagram of a fault prediction model according to some embodiments of the present disclosure.

In some embodiments, as shown in FIG. 3, the fault prediction model 310 may include the prediction layer 320 and the review layer 330. The prediction layer 320 and the review layer 330 may be obtained by separate training.

In some embodiments, the prediction layer may be a long short-term memory neural network (LSTM) model.

As shown in FIG. 3, in some embodiments, inputs to the prediction layer 320 may include production data 321, historical fault record 322, vibration data 323, product parameter data 324, historical maintenance record 325, and reference data 326, and output of the prediction layer 320 may include a fault probability sequence 340.

In some embodiments, the prediction layer may be obtained by training with the first training sample set. More descriptions may be found in previous related descriptions.

In some embodiments, the review layer may be a Recurrent Neural Network (RNN) model.

As shown in FIG. 3, in some embodiments, inputs to the review layer 330 may include a fault probability sequence 340, the production data 321, and environmental parameter 331, and outputs of the review layer 330 may include the predicted efficiency distribution data 350 after a predetermined period of time. More description about the environmental parameter and the predicted efficiency distribution data may be found in FIG. 2 and its related descriptions.

In some embodiments, the cloud platform may obtain a plurality of second training samples with the second labels to constitute a second training sample set, and the review layer 330 may be obtained by training based on the second training sample set. In some embodiments, the review layer 330 may be obtained by a training process similar to the training process of the prediction layer described above.

In some embodiments, the second training samples may include a sample fault probability sequence, the sample production data, and the sample environmental parameter. The second labels may be the predicted efficiency distribution data corresponding to the second training sample. In some embodiments, the second labels may be determined based on a difference between the actual recorded production efficiency of the second training sample for a subsequent period of time and the historical production efficiency of the second training sample for the corresponding historical time period. For example, if the production efficiency for the subsequent period of time is risen compared to the historical production efficiency and the rise is greater than the first threshold, the second label is (up, 1), (unchanged, 0), and (down, 0); if the production efficiency for the subsequent period of time is declined compared to the historical production efficiency and the decline is greater than the second threshold, the second label is (up, 0), (unchanged, 0), and (fall, 1); if the production efficiency for the subsequent period of time is declined but the decline not exceeding the second threshold compared with the historical production efficiency, or the production efficiency for the subsequent period of time is risen but the rise not exceeding the first threshold compared with the historical production efficiency, it may be considered unchanged. The first threshold and the second threshold may be predefined.

According to some embodiments of the present disclosure, determining the fault probability sequence by the fault prediction model is capable of utilizing the self-learning capability of a machine learning model to find a pattern from a large amount of historical data, and obtain the relationship among the production data, the historical fault records, the vibration data, product parameter data, historical maintenance records, reference data, the fault probability sequence, or the like, which improves the accuracy and efficiency of determining the fault probability sequence. The determination of the predicted efficiency distribution data through the review layer of the fault prediction model is capable of utilizing the self-learning capability of the machine learning model to find patterns from a large amount of historical data, and obtain the relationship among the production data, the environmental parameters, the fault probability sequence, and the predicted efficiency distribution data, or the like, thereby improving the accuracy and efficiency of determining the predicted efficiency distribution data.

In some embodiments, the cloud platform may determine whether the predicted efficiency distribution data satisfy the adjustment condition. The adjustment condition may include that the down probability in the predicted efficiency distribution data is greater than the up probability, and that the down probability is greater than a down threshold. The down threshold is a threshold condition for determining the down probability.

In some embodiments, in response to a determination that a number of times that the prediction efficiency distribution data obtained from the multiple predictions satisfy the adjustment condition is greater than a number of times threshold, the cloud platform may determine that an adjustment of the operating parameter is required.

The number of times threshold may be determined based on the type of fault of the most probable fault in the fault probability sequence. For example, the type of fault may be classified, such as by categorizing the level of fault into level 1, level 2, and level 3 based on the impacts caused by the fault, which represent severe impacts, general impacts, and minor impacts, respectively. The cloud platform may pre-set corresponding initial number of times thresholds for different fault levels. For example, the cloud platform may set a smaller initial number of times threshold for faults with level 1 and a larger initial number of times threshold for faults with level 3.

In some embodiments, the cloud platform may determine a fault level corresponding to the fault with the highest probability, and then determine an initial number of times threshold based on the fault level; determine a correction value based on the fault probability corresponding to the fault with the highest probability; and correct the initial number of times threshold to determine the number of times threshold based on the correction value.

In some embodiments, the cloud platform may determine a correction value based on a preset correction table. The preset correction table may include a probability of fault and a correction value corresponding to the probability of fault. In some embodiments, the correction value is negatively correlated with the probability of fault, and the correction value may be negative.

For example, if the fault with the highest probability in the fault probability sequence is a fault with level 1 with an initial number of times threshold of 4, and a correction value is determined as +1 in the preset correction table based on the probability of the fault, the determination of the number of times threshold may be 5. If the correction value is determined as −1 in the preset correction table based on the probability of fault, the number of times threshold is determined to be 3.

In some embodiments, the preset correction table may be set by a human. For example, if the probability of fault is greater, the smaller the correction value, and the smaller the number of times threshold, it indicates a greater need for timely processing; conversely, if the probability of fault is less, the larger the correction value, and the larger the count threshold, it indicates a greater need for observation.

According to some embodiments of the present disclosure, judging whether or not the operating parameter of the production line equipment needs to be adjusted based on the predicted efficiency distribution data and the down threshold takes into account the case where the probability of fault is lower than the probability threshold, and the judgment may be made more accurately. It is determined whether the production line needs to be adjusted using the fault prediction model to predict the future productivity change trend and the corresponding probability, and analyzing the predicted efficiency distribution data through multiple consecutive predictions, which can take steps to maintain or even increase production before the efficiency drops. The predicted efficiency distribution data from a single prediction may be subject to chance, but multiple consecutive predictions may help to distinguish true trend changes in productivity and short-term fluctuations, reduce the likelihood of miscalculations, and determine whether adjustments to operating parameters are really necessary to avoid unnecessary changes.

In some embodiments, the cloud platform may determine preset intervals and drop thresholds based on user input.

In some embodiments, the cloud platform may determine preset intervals and drop thresholds based on the current production rate and historical fault frequency.

In some embodiments, the preset interval is negatively correlated with at least one of the current production rate and the historical fault frequency, and the drop threshold is negatively correlated with at least one of the current production rate and the historical fault frequency. For example, the faster the current production rate or the higher the historical fault frequency, the shorter the preset interval is; and the drop threshold may be set low when the current production rate or the historical fault frequency is high.

In some embodiments, the cloud platform may determine preset intervals and drop thresholds based on current production rates and historical fault frequencies by looking up a preset table. The preset table may include a production rate, a fault frequency, and preset intervals and drop thresholds corresponding to that production rate and fault frequency.

According to some embodiments of the present disclosure, the current production rate and historical fault frequency cause determination of preset intervals and drop thresholds more accurate to facilitate timely detection of potential fault trends. When the current production rate is increased, it means that the equipment is more loaded, and the likelihood of potential faults increases. Shortening the preset intervals causes for more frequent checking of equipment status, which may help to identify potential problems in a timely manner. On the contrary, when production rates are low, longer preset intervals may reduce unnecessary consumption of computational resources while still maintaining sufficient monitoring density. Alternatively, for devices with higher production rates or higher historical fault frequencies, setting a lower drop threshold may help to identify trends that may lead to faults earlier, so that action may be taken earlier.

Step 230, in response to a determination that the operating parameter of the production line equipment needs to be adjusted, generating the production process parameters and the adjust time based on the production data.

The production process parameter is a target parameter that needs to be met by the operating parameter of the production line equipment. In some embodiments, the production process parameter may include at least one of a target screening parameter, a target conveying parameter, a target assembly parameter, and a target quality detection parameter.

The adjust time is the time set for adjusting the operating parameter. When determining the need to adjust the operating parameter, in some cases, it may require a delay in adjusting the operating parameter rather than adjusting the operating parameter in real time. In some embodiments, for changing production requirement that a factory user actively input to the IIoT system, the adjust time may be time after the completion of the production process for the previous batch of products.

In some embodiments, the adjust time may be set to 0, indicating immediate adjustment of the operating parameter.

In some embodiments, the cloud platform may generate the production process parameter, as well as the adjust time, based on production requirements input by factory users. For example, when the production demand for a single-day order is elevated, the conveying parameter, the screening parameter, the assembly parameter, the quality detection parameter, or the like may be increased as the target conveying parameter, the target screening parameter, the target assembly parameter, or the target quality detection parameter, based on the operating parameter adopted in the previous production. For example, the number of assembly stations and the corresponding equipment invested in the assembly parameter are increased, and the number of welding stations in the welding parameter is increased correspondingly.

In some embodiments, the cloud platform may determine the production process parameter based on the types of defects that appear most frequently in the production data. In some embodiments, the cloud platform may determine the production process parameter based on the types of defects that appear most frequently and the preset defect table. The preset defect table may include defect types and corresponding adjustment schemes. The adjustment schemes may include the category of the operating parameter that needs to be adjusted, the direction of the adjustment, and the target value that the operating parameter needs to be adjusted to reach. In some embodiments, the preset defect table may be obtained based on historical data statistics.

In some embodiments, in response to a determination that the operating parameter of the production line equipment needs to be adjusted, the cloud platform may determine a possible fault of the production line based on the fault probability sequence; and determine the production process parameter based on the possible fault and the production characteristics.

The possible fault is a fault whose probability in the fault probability sequence is greater than a probability threshold. In some embodiments, the possible fault may be the fault with the highest probability in the fault probability sequence.

The production characteristics are characteristics related to the production process and production results of a production line. More about the production characteristics may be found in FIG. 4 and its related descriptions.

In some embodiments, the cloud platform may determine the cause of the fault based on the possible fault and the production characteristics, and determine the production process parameter based on the cause of the fault.

In some embodiments, the cause of the fault may include at least one of an excessive operating load of the production line equipment or excessive mechanical wear. In some embodiments, the cause of the fault may also be "null", which indicates that the production line equipment has a serious problem or the corresponding cause may not be found. At this point, the cloud platform may issue a shutdown inspection command to the IIoT management platform, and the IIoT management platform conveys a recommendation for shutdown inspection based on actual needs to eliminate safety hazards.

In some embodiments, the cloud platform may determine the cause of the fault in a variety of ways based on the possible faults and the production characteristics.

In some embodiments, the cloud platform may construct a fault characterization vector based on the possible fault, the production characteristics, the current operating parameter, and the environmental parameter; match in a reference database based on the fault characterization vector, and determine the cause of the faults. The environmental parameters may include temperature parameters, humidity parameters. The reference database includes a plurality of reference fault characterization vectors and corresponding reference fault causes. The current operating parameters are the operating parameters of the production line equipment at the current time point.

In some embodiments, the cloud platform may construct at least one reference fault characterization vector based on historical faults, historical production characteristics, historical operating parameters, and historical environmental parameters in the historical data by the same way as constructing the fault characterization vectors, and take the historical fault cause corresponding to the historical fault as the reference fault cause corresponding to the reference fault characterization vector.

In some embodiments, the cloud platform may identify a reference fault cause corresponding to a reference fault characterization vector in the reference database that is closest in distance to the fault characterization vector as a cause of fault for the possible fault.

In some embodiments, the cloud platform may determine the production process parameter based on the cause of the fault and the current operating parameters. For example, if the cause of the fault is that the operating power of the production line equipment is too high, the cloud platform may adjust the operating power of the production line equipment downward based on the current operating parameters to determine the production process parameters. The magnitude of the adjustment of the operating parameters may be correlated to an average probability of the possible fault. The higher the average probability of the possible fault, the larger the adjustment magnitude may be.

In some embodiments of the present disclosure, determining the cause of the fault by the fault probability sequence to determine the production process parameter may be used to obtain more appropriate production process parameter for the possible fault situations of the production line equipment so as to avoid the fault as much as possible. By predicting the probability of fault at a future time point, measures may be taken before the fault actually occurs, thereby effectively preventing the fault. By identifying early the causes of faults that may lead to a loss of efficiency and adjusting the operating parameters accordingly, it is possible to keep the production line running at a high production rate and production quality level, avoiding unnecessary downtime or overloading and waste during the production process, thus improving overall productivity.

In some embodiments, the cloud platform may firstly generate at least one set of candidate production process parameters, and then select the production process parameters from the at least one set of candidate production process parameters based on the production data. More about how to determine the production process parameters based on the candidate production process parameters may be found in FIG. 4 and its related descriptions.

Step 240, generating a process adjustment instruction based on the production process parameter and the adjust time.

The process adjustment instruction is an instruction for controlling or adjusting the operating parameters of the production line equipment. The process adjustment instruction may include the production process parameter and the adjust time.

In some embodiments, the cloud platform may distribute the generated process adjustment instructions to the IIoT management platform via the distributed server.

Step 250, analyzing the process adjustment instruction via the IIoT management platform, and regulating the operating parameter of the production line equipment based on the process adjustment instruction when the adjust time is reached.

The embodiments of the present disclosure do not have any special limitation on the way of parsing the instructions.

In some embodiments, the IIoT management platform may regulate the first working parameters of the screening equipment based on the process adjustment instruction to cause the operating parameters of the screening equipment to reach the target screening parameter. The screening equipment (e.g., thermostat screening equipment) may screen thermostats by using vision inspection in conjunction with a robotic arm. The first working parameters of the thermostat screening apparatus may include the positional accuracy and the moving speed of a robotic arm, and the accuracy of a sensor set on the robotic arm. By regulating the first working parameters, the screening parameters may be affected, which in turn achieves the purpose of regulating the size of the thermostat, the type of the thermostat, the appearance defects, and the screening speed of the thermostat screening apparatus. For example, increasing the positional accuracy and movement speed of the robotic arm may increase the thermostat screening speed.

In some embodiments, the IIoT management platform may regulate the second working parameter of the conveying device based on the process adjustment instructions to cause the operating parameter of the conveying device to reach the target conveying parameter. The second working parameter of the conveying device may include the motor power of the conveying device. By regulating the motor power of the conveying device, the conveying parameter may be affected, which in turn achieves the purpose of regulating the conveying beat of the conveying device and the conveying speed of the material. For example, increasing the motor power of the conveying device may increase the speed of movement of the conveyor belt, which in turn may increase the conveying beat and the material conveying speed.

In some embodiments, the IIoT management platform may regulate the first setting parameter of the assembly equipment based on the process adjustment instruction to cause the operating parameter of the assembly equipment to reach the target assembly parameter. The assembly equipment may comprise over-temperature sensor assembly equipment, and the controller is the control system that controls the assembly equipment, which may be a PLC. The first setting parameter may include parameters related to soldering parameters, connection methods, packaging parameters, or the like of the soldering apparatus (e.g., the soldering machine), e.g., soldering power, speed, or the like of the soldering apparatus. The first setting parameter of the assembly equipment is regulated by regulating the parameter of the controller of the over-temperature sensor assembly equipment, and the welding parameter, the connection method, and the packaging parameter of the assembly equipment may be regulated.

In some embodiments, the IIoT management platform may regulate the second setting parameter of the quality detection device to cause the operating parameters of the quality testing device to reach the target quality detection parameters. The controller of the quality testing device is the control system that controls the quality testing device, which may be a PLC. The second setting parameter may include the parameter related to an accuracy parameter, a measurement range parameter, an environment simulation parameter, a response time parameter, or the like of the quality testing device. The precision parameter, the measurement range parameter, the environment simulation parameter, the response time parameter, or the like of the quality detection device may be regulated by regulating the controller of the quality detection device to regulate the second setting parameter of the quality detection device.

In some embodiments of the present disclosure, by the IIoT system and the cloud platform, based on the production data to determine whether to adjust the operating parameter of the production line equipment, the cloud platform may be utilized to integrate the massive amount of data in the various IIoT systems, and advanced data analysis and Artificial Intelligence technology may be utilized, thus realizing the intelligent recommendation of the production process, helping the production enterprise to quickly select the optimal production process program, and improving production efficiency and product quality.

It should be noted that the foregoing description of the process 200 is intended to be exemplary and illustrative only and does not limit the scope of application of the present disclosure. For a person skilled in the art, various corrections and changes may be made to the process 200 under the guidance of the present disclosure. However, these corrections and changes remain within the scope of the present disclosure.

Figure 4:
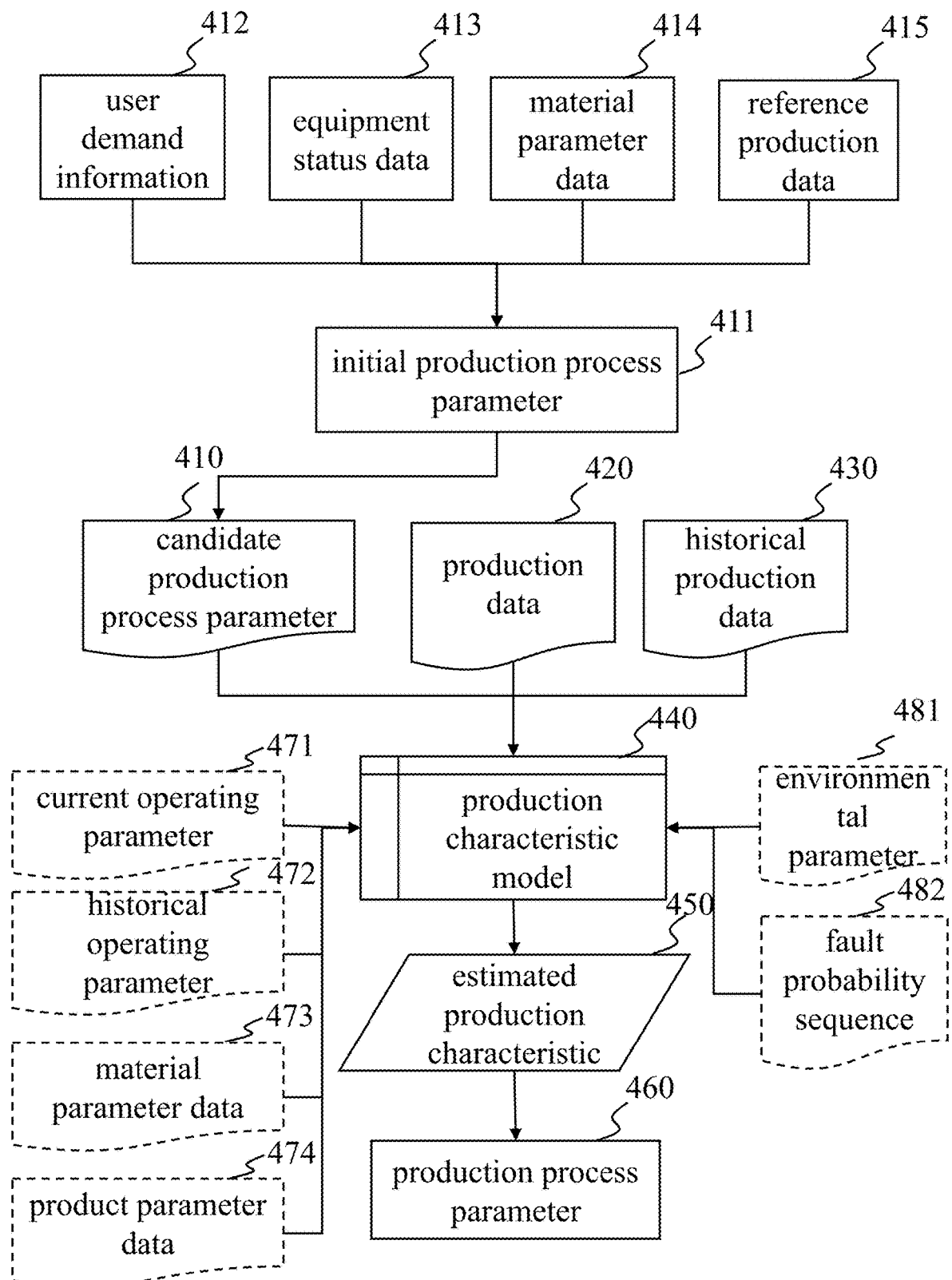
FIG. 4 is an exemplary schematic diagram of generating a production process parameter according to some embodiments of the present disclosure.

FIG. 4 is an exemplary schematic diagram of generating the production process parameter according to some embodiments of the present disclosure.

In some embodiments, the cloud platform may generate at least one group of candidate production process parameters 410; determine, through the production characteristic model 440, the estimated production characteristic 450 corresponding to each of the at least one group of candidate production process parameters based on the at least one group of candidate production process parameters 410, the production data 420 of the production line, and the historical production data 430; and determine the production process parameter 460 based on the estimated production characteristic 450 corresponding to each of the at least one group of candidate production process parameters.

The candidate production process parameters are alternative production process parameters. In some embodiments, the group of candidate process parameters may include at least one of a candidate screening parameter, a candidate conveying parameter, a candidate assembly parameter, and a candidate quality detection parameter.

In some embodiments, the cloud platform may generate candidate production process parameters in multiple ways. In some embodiments, the cloud platform may randomly adjust the current operating parameters of the production line equipment to generate candidate production process parameters.

In some embodiments, the cloud platform may obtain user demand information 412; determine the initial production process parameter 411 based on the user demand information 412, equipment status data 413, material parameter data 414, and reference production data 415; generate at least one group of candidate production process parameters 410 based on the initial production process parameter 411.

The user demand information is the user requirement for a production product or production process. In some embodiments, the user demand information may include product quality requirements and target production efficiency. In some embodiments, the cloud platform may obtain the user demand information via the IIoT management platform.

The user demand information may be obtained in a variety of ways. For example, a factory user actively inputs the user demand information. As another example, the cloud platform alerts the factory user to input the user demand information. It is important to note that if the user's active input changes the production demand, it is necessary to wait for the production process of the previous batch of products is completed before adjusting the operating parameters.

More about the equipment status data and the reference production data may be found in FIG. 2 and its related descriptions.

The material parameter data is the data related to the raw material. In some embodiments, the material parameter data may include the thermostat type, specifications (e.g., rated voltage, current, measurement range, or the like), the thermistor type and specifications (e.g., resistance value, thermal index, operating temperature range, resistance temperature characteristics, or the like), the material type, material specifications, or the like.

The initial production process parameters are initially set production process parameters. In some embodiments, the cloud platform may construct a production characteristic vector based on the product quality demand, the equipment status data, the material parameter data, and the target production efficiency, and perform a production database matching to determine the initial production process parameter based on the production characteristic vector.

In some embodiments, for non-numeric characteristics (e.g., connection method, thermostat type, or the like), the cloud platform may perform encoding process. The encoding process may include one-hot encoding or label encoding. The cloud platform may combine processed characteristics to form a vector.

The production database may include a plurality of sets of reference production characteristic vectors and corresponding reference production process parameters. In some embodiments, the cloud platform may construct, based on product quality requirements, the equipment status data, the material parameter data, and target production efficiencies in historical data, at least one reference production characteristic vector and determine the reference production process parameters corresponding to the reference production characteristic vector. In some embodiments, a corresponding reference production process parameter may be designed by a professional based on each reference production characteristic vector. In some embodiments, it is also possible to actually experiment with a plurality of sets of production process parameters under the conditions corresponding to the reference production characteristic vector, and select the set of production process parameters with the best results (e.g., fast production rate and high pass rate) as the reference production process parameters corresponding to this reference production characteristic vector. The cloud platform may store the plurality of group of reference production characteristic vectors and corresponding reference production process parameters into a database to complete the construction of the production database.

In some embodiments, the production database may be an open-source library such as Milvus or Faiss designed specifically for vector similarity search.

In some embodiments, the cloud platform may determine the initial production process parameter corresponding to the standard production characteristic vector that is closest in distance to the production characteristic vector as the initial production process parameter corresponding to that production characteristic vector.

In some embodiments, the cloud platform may randomly generate at least one group of candidate production process parameters based on the initial production process parameters.

In some embodiments, the cloud platform may define an adjustment range for each parameter based on the initial production process parameters. The cloud platform may randomly select a value from the adjustment range of the initial production process parameters, which in combination results in a randomly generated group of candidate production process parameters. The adjustment range is a preset range of optional production process parameters.

As an example only, for a conveyor beat of 30 s/piece in the initial production process parameter, the adjustment range is +20%. When generating the candidate production process parameter, the conveyor beat in the candidate production process parameter may be selected from 24 s/piece to 36 s/piece.

When the user enters a clear requirement, for example, a defined connection between the thermostat and the thermistor or a defined number of thermistors, the relevant soldering parameters need to be modified accordingly, and the modification manner is also fixed. These parameters that clearly need to be modified and are relatively fixed may be represented in the initial production process parameters without need of randomly generation. Thus, according to some embodiments of the present disclosure, generating candidate production process parameters from the user demand information may speed up calculations and provide a good initial value. At the same time, the number of times of a bad candidate production process parameter is generated may also be reduced, and the optimal production process parameter may be found more quickly, thereby improving production efficiency.

In some embodiments, the production characteristic model is a machine learning model. In some embodiments, the production characteristic model may be a machine learning model with a custom structure. The production characteristic model may also be a machine learning model with other structures, such as a neural network model, a recurrent neural network model, or the like.

In some embodiments, inputs to the production characteristic model may include at least one set of candidate production process parameter, the production data of the production line, the historical production data, and outputs may include the estimated production characteristics corresponding to each of the at least one group of candidate production process parameters.

The estimated production characteristic is a predicted characteristic associated with the production process and production results of the production line. In some embodiments, the estimated production characteristic may include at least one of a predicted production rate, a predicted production pass rate, a predicted defect type sequence, or the like. The predicted defect type sequence may include a predicted defect type that is likely to occur and a percentage of that defect type among all defect types.

As shown in FIG. 4, in some embodiments, the inputs to the production characteristic model 440 may also include current operating parameter 471, the historical operating parameter 472, the material parameter data 473, the product parameter data 474. More about the operating parameter and the product parameter data may be found in FIG. 2 and its related descriptions.

In some embodiments, the cloud platform may obtain a plurality of third training samples with third labels to constitute a third training sample set, the production characteristic model may be obtained by training based on the third training sample set. The third training sample set may be obtained in historical data. In some embodiments, each third training sample in the third training sample set may comprise a sample production process parameter, a sample current production data, a sample historical production data, a sample current operating parameter, a sample historical operating parameter, a sample material parameter data, and a sample product parameter data. The third label of each third training sample in the third training sample set may be an actual production characteristic corresponding to that training sample. The third label may be determined by the system or by a human after collection. The production characteristic model may be obtained by a training process similar to the training process of the fault prediction model in FIG. 2.

In some embodiments, the training process of the production characteristic model may include a first training phase and a second training phase.

The first training phase is a pre-training phase before it is accessed to a specific plant. In the first training phase, the training samples are acquired based on a large number of generic datasets on the cloud platform. The cloud platform may collect a large number of generalized datasets, so the production characteristic model may be pre-trained firstly. The purpose of pre-training is to cause the production characteristic model to learn some generally applicable characteristics and laws, and to lay the foundation for subsequent scene-specific training.

The second training phase is a phase of personalized and customized training based on a specific plant. In the second training phase, the training sample set includes data actually collected by the specific plant, and the percentage of training samples corresponding to each defect type in the training sample set is not less than the preset sample threshold. The preset sample threshold may be set artificially.

In the second training phase, the cloud platform may be intensively trained with the real production data of individual factories to obtain the production characteristic model corresponding to each factory separately. The reinforcement algorithms used for reinforcement training may include Q-learning, Deep Q-Networks (DQN), Proximal Policy Optimization (PPO), or the like.

In the second training phase, the type of defects that specifically correspond to each training sample may also be captured when the third label is collected. Some of these defect types are more severe and some are more minor. Specific defect types may therefore also be considered when designing the composition of the sample. For example, for serious defects, it should be ensured that there are enough representative samples in the sample, even if the frequency of occurrence is low.

In some embodiments, the cloud platform may grade different kinds of defect types, e.g., manually performing the grading. For different levels of defect types, such as "severe defects", "moderate defects", and "minor defects", different preset thresholds may be set. The preset threshold corresponding to the severe defect may be set to be the highest. For example, if the defect type sequence of the second label in a training sample has the highest percentage of severe defects, then this type of samples may be collected more in the sample set.

According to some embodiments of the present disclosure, pre-training the production characteristic model firstly ensures the robustness and generalizability of the model. Then the production characteristic model is further trained to guarantee the number of samples of various defect types, which can improve the accuracy of the model.

In some embodiments, a temperature sensor deployed at at least one location on the production line may be configured to obtain temperature data at a corresponding location of the temperature sensor, and a humidity sensor deployed at at least one location on the production line may be configured to obtain humidity data at the corresponding location of the humidity sensor. The temperature data and the humidity data may constitute environmental parameters.

As shown in FIG. 4, in some embodiments, the inputs to the production characteristic model 440 may also include the environmental parameter 481 and the fault probability sequence 482. Correspondingly, the third training sample set of the production characteristic model may also include sample environmental parameter and sample fault probability sequence. More about the fault probability sequence may be found in FIG. 2 and its related descriptions.

The environmental parameter has a significant impact on the operation of the equipment and the quality of the product. According to some embodiments of the present disclosure, incorporating environmental parameter into the model inputs may help the model to more accurately predict production characteristics, and changes in environmental conditions may lead to fluctuations in equipment performance. By taking into account these variations, the obtained production characteristic model may be more robust and maintain high predictive performance even when environmental conditions change. Further, potential faults may cause a decrease in production rate or production quality (e.g., qualification rate), and incorporating the fault probability sequence as model inputs may make prediction of the production characteristic model more comprehensive.

In some embodiments, for each of the at least one group of candidate production process parameters, the cloud platform may determine, based on the estimated production characteristic corresponding to the group of candidate production process parameters, the adjustment effect score corresponding to the group of candidate production process parameter, and select, from at least one group of candidate production process parameters, the group of candidate production process parameter with the highest adjustment effect score and the adjustment effect score higher than a score threshold as the production process parameter.

The adjustment effect score is a predicted score of the effect achieved after the candidate production process parameter take effect. The score threshold may be set by a human.

In some embodiments, for each of at least one group of candidate production process parameters, the cloud platform may determine the adjustment effect score corresponding to the group of candidate production process parameters based on the estimated production speed, estimated production qualification rate, and proportion of minor defect in the estimated production characteristics.

In some embodiments, the adjustment effect score may be determined by the following formula (1):

$$m = e \times p_1 + f \times p_2 + g \times r \quad (1)$$

Where m is the adjustment effect score, $p_1$ is the predicted production speed, $p_2$ is the predicted production pass rate, and r is the proportion of minor defect. The coefficients e, f, and g are weights, indicating that the chosen production process parameters may achieve a high production qualification rate while also taking into account the production rate. In some embodiments, the coefficients e, f, and g may be set by a user. For example, if the user values the production speed more than the qualification rate, the coefficient e may be set higher than the coefficient f.

In some embodiments, if none of the adjustment effect scores corresponding to any group of candidate production process parameter reach a score threshold, the cloud platform may expand the adjustment range to generate more candidate production process parameters.

When the process adjustment instruction is executed, the actual adjustment effect may be or may not be better. For example, the production rate or the qualification rate is still not as expected.

In some embodiments, if the actual adjustment effect fails to meet the expectation, the cloud platform may call the production characteristic model and the acquired relevant data based on the manner described in FIG. 2 to re-determine the production process parameters.

In some embodiments, the cloud platform may collect the actual production characteristics after the process adjustment instruction are executed; and dynamically adjust the process adjustment instruction are based on the actual production characteristics.

In some embodiments, the cloud platform may collect the actual production characteristics and compare the actual effect score calculated based on the actual production characteristics to the original adjustment effect score (subsequently referred to as the original effect score) when the process adjustment instruction is not executed. The actual effect score and the original effect score are calculated in the same way as the adjustment effect score. The actual production characteristic is the characteristic of the actual production process after the process adjustment instruction is executed. In some embodiments, the actual production characteristic may include at least one of the actual production rate, the actual production qualification rate, the actual defect type, or the like.

In some embodiments, if the actual effect score is higher than the original effect score, the adjustment may continue to be made directly in accordance with the previous direction of adjustment (i.e., the direction of adjustment in the process adjustment instruction executed as described above), and if the actual effect score is lower than the original effect score, the adjustment may be made in the opposite direction of the previous direction of adjustment. The previous adjustment direction is the comparison of the currently issued production process parameters and the operating parameters before adjustment.

For example, if the current actual effect score is improved compared to the original effect score, and the previous direction of adjustment is to increase the pressure of the superheat sensor encapsulation and reduce the encapsulation speed, at this time, the pressure of the superheat sensor encapsulation may continue to be increased and the encapsulation speed may continue to be reduced. On the contrary, if the current actual effect score is lower than the original effect score, the pressure of the ultra-temperature sensor encapsulation may be reduced and the encapsulation speed may be increased.

In some embodiments, when adjusting in accordance with the adjustment direction, the adjustment may be made at a predetermined adjustment magnitude or the adjustment magnitude may be negatively correlated to an incremental amount of the actual effect score compared to the original effect score. For example, if the power of the device is adjusted at a preset adjustment magnitude of 10 w, the adjustment is continued at a magnitude of 10 w per adjustment to prevent over-adjustment.

In some embodiments of the present disclosure, dynamically adjusting the process adjustment instruction according to the actual production characteristics may avoid a situation in which the adjustment effect is unsatisfactory for a long period of time, so as to change the adjustment direction in a timely manner according to the actual situation.

In some embodiments, the user demand information may also include a cost budget limit. The cloud platform may determine the production process parameter based on the cost budget limit as well as the estimated production characteristic corresponding to each group of candidate production process parameter.

The cost budget limit is the set upper limit on the cost of the production line. In some embodiments of the present disclosure, the cost is expressed primarily through power consumption.

In some embodiments, the cloud platform may identify candidate production process parameter whose the adjustment effect score is greater than a score threshold as alternative production process parameter; for each alternative production process parameter, a cost indicator is calculated.

The cost indicator may be understood as the average power consumption required to generate a product.

In some embodiments, the cloud platform may determine cost indicator for alternative production process parameters based on historical data by a fitting function. The fitting function may be expressed by formula (2):

$$y = a \times x_1 + b \times x_2 + c \times x_3 \tag{2}$$

Where $x_1$ is the product specification, $x_2$ is the estimated production rate, $x_3$ is the corresponding alternative production process parameter, and y is the cost indicator corresponding to the alternative production process parameter. More description about product specification and estimated production rate may be found in the previous description. a, b, and c are coefficients, which may be obtained by fitting a large amount of historical data using a fitting algorithm.

In some embodiments, the cloud platform may further determine the production process parameters based on cost indicators corresponding to the alternative production process parameters. In some embodiments, the cloud platform may determine a modification score for the alternative production process parameters based on the adjustment effect score of the alternative production process parameters and the cost indicator, and select an alternative production process parameter with the highest modification score from the plurality of alternative production process parameters as the production process parameter.

In some embodiments, the modification score may be determined by the following formula (3):

$$M = m + d \times y \tag{3}$$

Where M is the modification score, m is the adjustment effect score, y is a cost indicator corresponding to the alternative production process parameter, and d is a coefficient. The coefficient d is negative, indicating that under the same condition, the lower the cost indicator (i.e., electricity consumption), the larger the modification score. In some embodiments, the coefficient d may be related to the price of electricity, the more expensive the price of electricity, the greater the absolute value of the coefficient d.

If the user specifies a cost budget limit, the selection of the production process parameters from a plurality of candidate production process parameters may also require consideration of whether the production cost exceeds the cost budget limit. In some embodiments of the present disclosure, determining the production process parameters by the cost budget limit may satisfy the user's requirement for cost and save cost. As a result, it can be ensured that the selected production process parameters may satisfy the requirements of product quality and productivity without exceeding the user's cost budget limit, which helps to optimize cost and improve economic efficiency while ensuring product quality and allows for flexible adjustments to production strategies based on different cost budgets to better meet market demands.

In some embodiments of the present disclosure, the production process parameters may be accurately determined by generating the candidate production process parameters and the production characteristic model, thereby realizing the intelligent recommendation of the production process. By predicting the production characteristics corresponding to each group of candidate production process parameters through the production characteristic prediction model, and adjusting the effect score based on the production characteristics, the optimal production process parameters may be selected. This approach not only improves productivity and product quality, but also reduces production cost, enhances the flexibility and controllability of the production process, and provides data-driven decision-making support for production line managers to ensure effective utilization of resources and reduce production uncertainties.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Finally, it should be understood that the embodiments described in the present disclosure are used only to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for intelligent recommendation of a production process by Industrial Internet of Things (IIoT) information cloud sharing, wherein the method is implemented on a cloud platform, and the cloud platform includes a distributed server, wherein the cloud platform connects to multiple IIoT systems corresponding to multiple factories through the distributed server; wherein the IIoT system includes an IIoT user platform, an IIoT service platform, an IIoT management platform, an IIoT sensor network platform, and an IIoT perception control platform; wherein the IIoT perception control platform is configured as a production line equipment and a data acquisition device deployed on a production line, the IIoT perception control platform is configured to realize data interaction with the IIoT management platform through the IIoT sensor network platform, and the IIoT management platform is configured to realize data interaction with the cloud platform;

wherein the data acquisition device includes a temperature sensor and a humidity sensor deployed at at least one location on the production line; and for each of the at least one location, the temperature sensor is configured to collect temperature data corresponding to the at least one location, the humidity sensor is configured to collect humidity data corresponding to the at least one location, and the temperature data and the humidity data constitute an environmental parameter; and the method includes:

obtaining and storing, based on the IIoT management platform, production data of the production line;

determining, based on the production data, whether an operating parameter of the production line equipment needs to be adjusted;

in response to a determination that the operating parameter of the production line equipment needs to be adjusted, generating, based on the production data, a production process parameter and an adjust time; wherein the generating the production process parameter includes:

generating at least one group of candidate production process parameters;

determining, based on the at least one group of candidate production process parameters, the production data of the production line, and historical production data, an estimated production characteristic corresponding to each of the at least one group of candidate production process parameters by a production characteristic model; and determining, based on the estimated production characteristic corresponding to each of the at least one group of candidate production process parameters, the production process parameter;

wherein the production characteristic model is a neural network model;

the production characteristic model is obtained by training based on a training sample set, and a training process of the production characteristic model includes a first training phase and a second training phase;

an input of the production characteristic model further includes a current operating parameter, a historical operating parameter, material parameter data, product parameter data, the environmental parameter, and a fault probability sequence;

training samples in the training sample set include a sample production process parameter, sample current production data, sample historical production data, a sample current operating parameter, a sample historical operating parameter, sample material parameter data, and sample product parameter data; and labels of the training samples are production characteristics corresponding to the training samples;

the first training phase is a pre-training phase before accessing a specific plant, and in the first training phase, the training samples are acquired based on a large number of generic datasets on the cloud platform; and the second training phase is a phase of personalized and customized training based on the specific plant, in the second training phase, the training sample set includes data collected by the specific plant, and a percentage of training samples corresponding to each defect type in the training sample set is not less than a preset sample threshold;

generating, based on the production process parameter and the adjust time, a process adjustment instruction and issuing the process adjustment instruction to the IIoT management platform;

analyzing the process adjustment instruction via the IIoT management platform, and regulating, via the IIoT management platform, the operating parameter of the production line equipment through a control system of the IIoT perception control platform based on the process adjustment instruction when the adjust time is reached;

wherein the production process parameter includes at least one of a target screening parameter, a target conveying parameter, a target assembly parameter, and a target quality detection parameter, and the production line equipment includes at least one of a screening equipment, a conveying device, an assembly equipment, and a quality detection equipment;

wherein the regulating the operating parameter of the production line equipment through a control system of the IIoT perception control platform based on the process adjustment instruction includes:

regulating, based on the process adjustment instruction, a first working parameter of the screening equipment to make the operating parameter of the screening equipment reach the target screening parameter, which includes operations performed by the screening equipment, the operations including:

screening, based on the process adjustment instruction, thermostats using vision inspection in conjunction with a robotic arm, wherein the first working parameters of the screening equipment include a positional accuracy and a moving speed of the robotic arm, and an accuracy of a sensor set on the robotic arm;

regulating, based on the process adjustment instruction, a second working parameter of the conveying device to make the operating parameter of the conveying device reach the target conveying parameter, including:

regulating, by regulating motor power of the conveying device, conveying beat of the conveying device and conveying speed of material;

wherein the second working parameter of the conveying device includes the motor power of the conveying device;

regulating, based on the process adjustment instruction, a first setting parameter of the assembly equipment to make the operating parameter of the assembly device reach the target assembly parameter, including:

regulating the first setting parameter of the assembly equipment by regulating parameter of a controller of an over-temperature sensor assembly equipment;

wherein the assembly equipment comprises the over-temperature sensor assembly equipment, and the controller is a control system that controls the assembly equipment, and the first setting parameter includes parameters related to soldering parameters, connection methods, and packaging parameters, or regulating, based on the process adjustment instruction, a second setting parameter of the quality detection equipment to make the operating parameter of the quality detection equipment reach the target quality detection parameter;

collecting, after execution of the process adjustment instruction, an actual production characteristic; and dynamically adjusting, based on the actual production characteristic, the process adjustment instruction, including:
in response to a determination that a current actual effect score is increased compared with an original effect score, a previous direction of adjustment is increasing a pressure of superheat sensor encapsulation and reducing an encapsulation speed, continuing to increase the pressure of the superheat sensor encapsulation and continuing to reduce the encapsulation speed.

2. The method of claim 1, wherein the generating at least one group of candidate production process parameters includes:
obtaining user demand information;
determining, based on the user demand information, equipment status data, and the material parameter data, an initial production process parameter; and
generating, based on the initial production process parameter, the at least one group of candidate production process parameters.

3. The method of claim 2, wherein the user demand information includes a cost budget limit, wherein the method further includes:
determining the production process parameter based on the cost budget limit and the estimated production characteristic corresponding to each group of candidate production process parameters.

4. The method of claim 3, wherein the determining the production process parameter based on the cost budget limit and the estimated production characteristic corresponding to each group of candidate production process parameters includes:
identifying a candidate production process parameter whose adjustment effect score is greater than a score threshold as an alternative production process parameter;
calculating a cost indicator for each alternative production process parameter, wherein the cost indicator is an average power consumption required to generate a product; and
determining, based on the cost indicator corresponding to the alternative production process parameter, the production process parameter.

5. The method of claim 1, wherein the data acquisition device further includes a vibration sensor deployed on the production line, wherein the vibration sensor is configured to obtain vibration data, and the method further includes:
determining, based on the production data of the production line, a historical fault record, the vibration data, the product parameter data, a historical maintenance record, and reference data, the fault probability sequence by a fault prediction model;
determining, based on a judgment result of whether the fault probability sequence satisfies a fault condition, whether the operating parameter of the production line equipment needs to be adjusted;
in response to a determination that the operating parameter of the production line equipment needs to be adjusted,
determining, based on the fault probability sequence, a possible fault of the production line;
determining, based on the possible fault and a production characteristic, the production process parameter.

6. The method of claim 5, wherein the determining whether the operating parameter of the production line equipment needs to be adjusted comprises:

predicting, in response to the fault probability sequence not satisfying the fault condition, based on the fault probability sequence, predicted efficiency distribution data of the production line after a predetermined period of time;
judging whether the operating parameter of the production line equipment needs to be adjusted based on the predicted efficiency distribution data corresponding to a plurality of consecutive predictions made at a preset interval.

7. The method of claim 6, wherein the judging whether the operating parameter of the production line equipment needs to be adjusted based on the predicted efficiency distribution data corresponding to a plurality of consecutive predictions made at a preset interval includes:
determining the preset interval and drop thresholds based on a current production rate and a historical fault frequency.

8. A non-transitory computer readable storage medium, wherein the storage medium storages computer instructions, when the computer instructions are executed by a processor, causing the processor to perform the method for intelligent recommendation of a production process by Industrial Internet of Things (IIoT) information cloud sharing of claim 1.

9. The method of claim 1, wherein a controller of a quality testing device is a control system that controls the quality testing device;
wherein the second setting parameter includes a parameter related to an accuracy parameter, a measurement range parameter, an environment simulation parameter, a response time parameter, and a precision parameter;
wherein the regulating, based on the process adjustment instruction, a second setting parameter of the quality detection equipment to make the operating parameter of the quality detection equipment reach the target quality detection parameter includes:
regulating, by regulating the controller of the quality detection device, the second setting parameter of the quality detection device.

10. A system for intelligent recommendation of a production process by Industrial Internet of Things (IIoT) information cloud sharing, wherein the system includes a cloud platform, and the cloud platform includes a distributed server, a data receiving module, a data processing module, an intelligent recommendation module, and a user interaction module; wherein
the cloud platform connects to multiple IIoT systems corresponding to multiple factories through the distributed server; wherein the IIoT system includes an IIoT user platform, an IIoT service platform, an IIoT management platform, an IIoT sensor network platform, and an IIoT perception control platform; wherein the IIoT perception control platform is configured as a production line equipment and a data acquisition device deployed on a production line, the IIoT perception control platform is configured to realize data interaction with the IIoT management platform through the IIoT sensor network platform, and the IIoT management platform is configured to realize data interaction with the cloud platform;
wherein
the data acquisition device includes a temperature sensor and a humidity sensor deployed at at least one location on the production line; and
for each of the at least one location, the temperature sensor is configured to collect temperature data corresponding to the at least one location, the humidity sensor is configured to collect humidity data corresponding to the at least one location, and the temperature data and the humidity data constitute an environmental parameter:

the data receiving module is configured to realize data interaction with the IIoT management platform of the IIoT system through the distributed server to receive production data of the corresponding IIoT system, the data processing module is configured to process the production data obtained through the data receiving module, the intelligent recommendation module is configured to make intelligent recommendation of the production process based on the processed production data, and the user interaction module is configured to display a recommendation result for a user to view and interact with the user;

the cloud platform is configured to:

obtain and store, based on the IIoT management platform, production data of the production line;

determine, based on the production data, whether an operating parameter of the production line equipment needs to be adjusted;

in response to a determination that the operating parameter of the production line equipment needs to be adjusted, generate, based on the production data, a production process parameter and an adjust time; wherein to generate the production process parameter the cloud platform is further configured to:

generate at least one group of candidate production process parameters;

determine, based on the at least one group of candidate production process parameters, the production data of the production line, and historical production data, an estimated production characteristic corresponding to each of the at least one group of candidate production process parameters by a production characteristic model; and determine, based on the estimated production characteristic corresponding to each of the at least one group of candidate production process parameters, the production process parameter:

wherein the production characteristic model is a neural network model;

the production characteristic model is obtained by training based on training sample set, and a training process of the production characteristic model includes a first training phase and a second training phase;

an input of the production characteristic model further includes a current operating parameter, a historical operating parameter, material parameter data, product parameter data, the environmental parameter, and a fault probability sequence;

training samples in the training sample set include a sample production process parameter, sample current production data, sample historical production data, a sample current operating parameter, a sample historical operating parameter, sample material parameter data, and sample product parameter data; and labels of the training samples are production characteristics corresponding to the training samples;

the first training phase is a pre-training phase before accessing a specific plant, and in the first training phase, the training samples are acquired based on a large number of generic datasets on the cloud platform; and the second training phase is a phase of personalized and customized training based on the specific plant, in the second training phase, the training sample set includes data collected by the specific plant, and a percentage of training samples corresponding to each defect type in the training sample set is not less than a preset sample threshold;

generate, based on the production process parameter and the adjustment time, a process adjustment instruction and issue the process adjustment instruction to the IIoT management platform;

analyze the process adjustment instruction via the IIoT management platform, and regulate, by the IIoT management platform, the operating parameter of the production line equipment through a control system of the IIoT perception control platform based on the process adjustment instruction when the adjust time is reached;

wherein the production process parameter includes at least one of a target screening parameter, a target conveying parameter, a target assembly parameter, and a target quality detection parameter, and the production line equipment includes at least one of a screening equipment, a conveying device, an assembly equipment, and a quality detection equipment;

wherein to regulate the operating parameter of the production line equipment through a control system of the IIoT perception control platform based on the process adjustment instruction, the cloud platform is further configured to:

regulate, based on the process adjustment instruction, a first working parameter of the screening equipment to make the operating parameter of the screening equipment reach the target screening parameter, wherein to regulate, based on the process adjustment instruction, a first working parameter of the screening equipment to make the operating parameter of the screening equipment reach the target screening parameter, the screening equipment is configured to:

screen, based on the process adjustment instruction, thermostats using vision inspection in conjunction with a robotic arm, wherein the first working parameter of the screening equipment include a positional accuracy and a moving speed of the robotic arm, and an accuracy of a sensor set on the robotic arm;

regulate, based on the process adjustment instruction, a second working parameter of the conveying device to make the operating parameter of the conveying device reach the target conveying parameter, wherein to regulate, based on the process adjustment instruction, a second working parameter of the conveying device to make the operating parameter of the conveying device reach the target conveying parameter, the cloud platform is further configured to:

regulate, by regulating motor power of the conveying device, conveying beat of the conveying device and conveying speed of material;

wherein
the second working parameter of the conveying device includes the motor power of the conveying device;
regulate, based on the process adjustment instruction, a first setting parameter of the assembly equipment to make the operating parameter of the assembly device reach the target assembly parameter; wherein to regulate, based on the process adjustment instruction, a first setting parameter of the assembly equipment to make the operating parameter of the assembly device reach the target assembly parameter, the cloud platform is further configured to:
regulate the first setting parameter of the assembly equipment by regulating parameter of a controller of an over-temperature sensor assembly equipment;
wherein
the assembly equipment comprises the over-temperature sensor assembly equipment, and
the controller is a control system that controls the assembly equipment, and the first setting parameter includes parameters related to soldering parameters, connection methods, and packaging parameters,
or
regulate, based on the process adjustment instruction, a second setting parameter of the quality detection equipment to make the operating parameter of the quality detection equipment reach the target quality detection parameter;
collect, after execution of the process adjustment instruction, an actual production characteristic; and
dynamically adjust, based on the actual production characteristic, the process adjustment instruction, wherein to dynamically adjust, based on the actual production characteristic, the process adjustment instruction, the cloud platform is further configured to:

in response to a determination that a current actual effect score is increased compared with an original effect score, a previous direction of adjustment is increasing a pressure of superheat sensor encapsulation and reducing an encapsulation speed, continue to increase the pressure of the superheat sensor encapsulation and continue to reduce the encapsulation speed.

11. The system of claim 10, wherein the cloud platform is further configured to:
obtain user demand information
determine, based on the user demand information, equipment status data, and the material parameter data, an initial production process parameter; and
generate, based on the initial production process parameter, the at least one group of candidate production process parameters.

12. The system of claim 10, wherein the data acquisition device further includes a vibration sensor deployed on the production line, wherein the vibration sensor is configured to obtain vibration data, and the cloud platform is further configured to:
determine, based on the production data of the production line, a historical fault record, the vibration data, the product parameter data, a historical maintenance record, and reference data, the fault probability sequence by a fault prediction model;
determine, based on a judgment result of whether the fault probability sequence satisfies a fault condition, whether the operating parameter of the production line equipment needs to be adjusted;
in response to a determination that the operating parameter of the production line equipment needs to be adjusted:
determine, based on the fault probability sequence, a possible fault of the production line;
determine, based on the possible fault and a production characteristic, the production process parameter.

* * * * *